United States Patent [19]

Coteus et al.

[11] Patent Number: 5,614,920
[45] Date of Patent: Mar. 25, 1997

[54] SECURE VIEWING OF DISPLAY UNITS USING AN ELECTRONIC SHUTTER

[75] Inventors: Paul W. Coteus, Yorktown Heights, N.Y.; Douglas S. Goodman, Sudbury, Mass.

[73] Assignee: International Business Machines Corporation, Armonk, N.Y.

[21] Appl. No.: 342,953

[22] Filed: Nov. 21, 1994

[51] Int. Cl.⁶ .................................................... G09G 5/00
[52] U.S. Cl. ..................................... 345/7; 345/4; 380/54
[58] Field of Search ............................. 345/8, 7, 9, 4, 345/5, 6, 32; 348/42, 46, 51, 52, 53, 54, 55, 56, 57, 58, 59; 380/6, 7, 54, 59; 359/462, 464, 466

[56] References Cited

U.S. PATENT DOCUMENTS

| | | |
|---|---|---|
| 2,832,821 | 4/1958 | Du Mont . |
| 3,621,127 | 11/1971 | Hope . |
| 3,991,266 | 11/1976 | Baer . |
| 4,122,484 | 10/1978 | Tan ............................................. 348/42 |
| 4,424,529 | 1/1984 | Roese et al. . |
| 4,772,944 | 9/1988 | Yoshimura . |
| 4,859,994 | 8/1989 | Zola et al. . |
| 4,879,603 | 11/1989 | Berman . |
| 4,881,179 | 11/1989 | Vincent . |
| 5,028,994 | 7/1991 | Miyakawa et al. ....................... 348/42 |
| 5,107,443 | 4/1992 | Smith et al. . |

*Primary Examiner*—Richard Hjerpe
*Assistant Examiner*—Xiao M. Wu
*Attorney, Agent, or Firm*—Scully, Scott, Murphy & Presser

[57] ABSTRACT

Apparatus for masking a displayed image by merging it with a second featureless image made of short pulses of light that are introduced into a transparent screen disposed between the display and the viewer. An electronic shutter timed to match the sequence of the masking light pulses separates or blocks the masking image to permit the primary image to be viewed only by the person having the electronic shutter.

12 Claims, 1 Drawing Sheet

|← EQUAL  →|
TIME INTERVALS

RANDOMLY LOCATED
WITHIN INTERVALS
ONE/INTERVAL

006E2D5
SECURE VIEWING OF DISPLAY UNITS USING AN ELECTRONIC SHUTTER

RELATED APPLICATIONS

The present invention is related to commonly assigned U.S. patent applications having Ser. Nos. 08/342,950 and 08/342,514, entitled SECURE VIEWING OF DISPLAY UNITS USING A WAVELENGTH FILTER and SECURE VIEWING OF DISPLAY UNITS BY IMAGE SUPERPOSITION AND WAVELENGTH SEPARATION, respectively, filed concurrently herewith, which have identity of inventorship and which are incorporated herein by reference. The U.S. patent application Ser. No. 08/342,514 now was U.S. Pat. No. 5,537,476.

BACKGROUND OF THE INVENTION

1. Field of the Invention

The present invention is directed to video display security systems and more particularly to a system for optically masking a display image and selective removal of the mask for secure viewing of the display.

2. Discussion of the Prior Art

The widespread use of laptop computers has enabled users to access information in any location. Often, information is retrieved during meetings or while traveling between destinations where many other people besides the user may view the display. A problem arises where the information displayed is confidential and should be seen only by the user.

While information security systems that provide various levels of security to multiple users on a network, such as that shown in U.S. Pat. No. 4,881,179, provide selected access to information, these systems do not protect unauthorized viewing of the information while it is being displayed.

U.S. Pat. No. 4,859,994 is directed to a system for providing selected viewing of a display to allow hearing impaired persons to view subtitles while others cannot see the subtitles. A liquid crystal display that produces the subtitles as polarized light can be seen only by viewers having polarized eyeglass lenses. Although selective viewing is provided, it is not secure viewing in that anyone having polarized sunglasses can see the information on the screen. In addition, the selectivity is not switchable in the event security is no longer required.

Thus, there is a need for a system for providing secure, selective viewing of information on a display that can be easily enabled and disabled by the viewer.

SUMMARY OF THE INVENTION

The present invention is directed to an apparatus for providing secure viewing of a primary image on a display by a viewer that includes means for generating an optical mask for the image and means for separating the optical mask from the primary image. The optical mask is generated by a secondary image produced between the display and the viewer where the secondary image mixes with the primary image to obscure the viewing of the primary image. In order to see the primary image, the viewer must have the means for removing the secondary image.

In one embodiment of the present invention, a screen is disposed between the display and the viewer and a mask of light is introduced into the interior of the screen. The screen is transparent to enable the mask of light to be seen by the viewer. The screen also does not distort the primary image on the display. The mask of light escapes from the front of the screen and mixes with the display image to obscure the display image. The mask of light is preferably encoded with a particular time and intensity sequence such as with short bursts of light at random time intervals. An electronic shutter is coupled to the source of the mask of light and has a timing sequence that matches the encoded mask sequence. The electronic shutter which may be provided as a pair of eyeglasses worn by the viewer, when actuated, closes at the time intervals at which the short bursts of light are generated to thereby block the mask of light and permit the viewer to see the primary image. The present invention has application not only in portable or other computer display terminals, but extends to any means of display using emitted light.

DETAILED DESCRIPTION OF THE INVENTION

Figure 1:
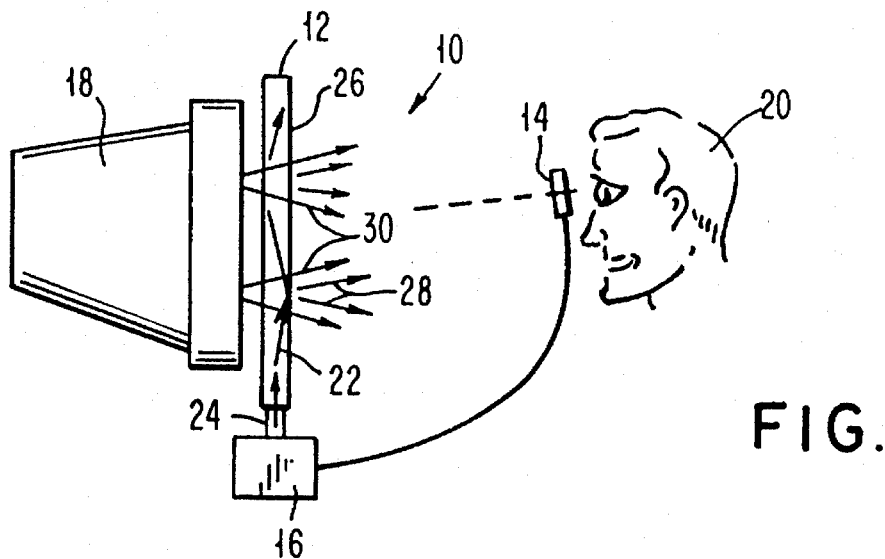
FIG. 1 is a schematic of the apparatus of the secure viewing display system in accordance with the present invention.

Referring now to the drawings, a schematic of the apparatus 10 of the present invention for providing secure viewing of display units is shown in FIG. 1. Apparatus 10 includes a thin, transparent sheet of material 12, an electronic shutter 14, and a control means 16. The transparent sheet 12 is placed in front of the display 18 or other unit containing the image to be viewed. The control means 16 is optically coupled to the transparent sheet 12 while being electrically coupled to the electronic shutter 14. The transparent sheet 12 and electronic shutter 14 are both positioned between the viewer 20 and the display 18. The control means 16 generates light waves depicted by rays 22 that are introduced into one or more edges of the sheet 12 through, for example, a light guide or other optical coupling means 24. Sheet 12 must be made of material that is thin enough so that it does not significantly distort the primary image to be viewed that is on the display 18. The light waves 22 which can be white or colored light travel through the sheet, with a fraction of the light 28 escaping from the front and back surfaces of the sheet 12. The light 28 escaping from the front surface 26 of the sheet 12 forms a mask of light that mixes with light 30 from the primary image to be viewed thereby obscuring the primary image. The rays 28 of the masking light are in effect a secondary image that mixes with the rays 30 of the primary image to prevent the primary image from being viewed.

Figure 2:
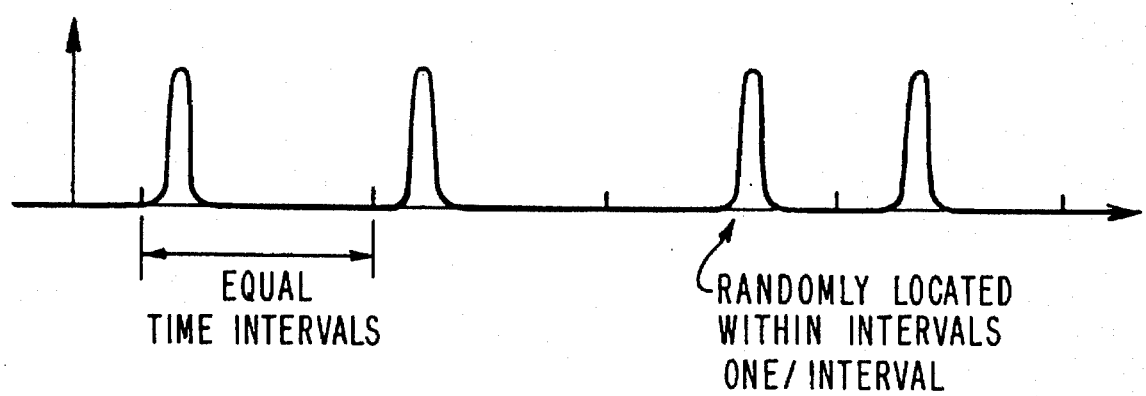
FIG. 2 is an example of a timing sequence for the mask of light of the secure viewing display system of the present invention.

The secondary image or mask of light in the preferred embodiment of the present invention consists of short bursts of light. The short bursts may be either in equal time intervals or at random intervals. FIG. 2 is one example of a possible intensity versus time plot for the mask of light. As can be seen, the short bright bursts of light are produced at irregular time intervals. The timing sequence of the short bursts of light act as an encryption code that can be selected by the user. A strobe light is a simple example of the sort of light that can be used to produce the secondary image that is introduced into the transparent sheet 12. The electronic shutter 14 separates the optical masking light 28 from the primary image 30 to permit the primary image to be viewed by the user 20. The masking light 28 is removed from view with the electronic shutter 14 in front of the viewer's eyes by matching the on/off control of the shutter to the timing sequence of the masking light. The matched timing control is provided by control means 16. For example, the shutter 14 is switched either transparent or opaque under control of the electronic control means 16 with the same timing sequence as the masking light. Therefore, in order to view the primary image the shutter 14 is switched to opaque whenever the masking light is being displayed and is transparent the rest of the time. The encryption code for the masking light can be selected by the user by providing appropriate adjustable light generation means within control 16. In addition, shutter 14 will also be adjustable to match the selected encryption code.

It is desirable that the shutter 14 be open far longer than it is closed, and therefore it is preferred that the masking light be in short bursts. Since the switch times of the shutter 14 and the time between the subsequent bursts of light is faster than the eye can track, or in other words, faster than 30–60 times per second, the primary image is made visible. Electronic shutters are known and have been made in the form of electronic controlled eyeglasses used in liquid crystals.

Figure 3:
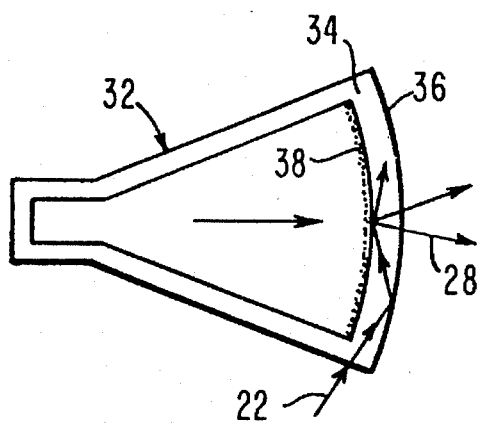
FIG. 3 is a schematic of a cathode ray tube having the secure viewing display system of the present invention.

In an alternative embodiment shown in FIG. 3, a cathode ray tube 32 is modified to provide a space 34 between the cover plate 36 and the phosphorus screen 38 into which the light 22 is introduced to generate the masking light 28. In this embodiment, the separate sheet of material 12 is unnecessary, but all other elements including the control means 16 and shutter 14 are required.

The security means of the present invention is disposed between the display and the viewer, which ensures that no one else can see the display except for the person having a shutter means coupled to the controller that controls both the timing of the masking light and the timing of the electronic shutter. The separation of the primary and secondary images in the present invention is by time sequencing. This security feature is easily disabled by turning off the masking light, and such a switch function can be easily provided with the control means 16. Therefore, where security is no longer required, the user need not use the special shutter eyeglasses to view the primary image. By having the shutter electronically coupled to the controller that generates the encoded secondary masking light, the shutter is easily synchronized with the masking light to permit selected viewing only by the user. The electronic shutter reduces the intensity of any image not on the display by an amount determined by the ratio of time the shuttered eyeglasses are opened and closed. This is controllable to some extent by the user and allows a flexibility in viewing.

In accordance with the present invention, a viewer who does not have shuttered eyeglasses coupled to the controller for generating the masking light will see a highly distorted image, preferably a featureless image that is produced by the secondary, preferably randomly generated, masking image. The masking image is switchable so that if security is not desired, the masking light can be switched off to allow anyone to see the undistorted primary image.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and desired to be secured by Letters Patent is:

1. An apparatus for providing secure viewing of a primary image on a display by a viewer comprising:

means for generating an optical mask for said image by generating a secondary image between the display and the viewer, said secondary image mixing with said primary image to obscure the viewing of the primary image; and means for separating said optical mask from said image by removing the secondary image from the view of only the viewer, so that the viewer only sees the primary image.

2. The apparatus of claim 1 wherein said means for removing the secondary image is coupled to said means for generating the secondary image.

3. The apparatus of claim 2 wherein said means for generating a secondary image includes means for selectively generating light in a predetermined form, and said means for removing the secondary image being adjusted to block the selected form of light of said secondary image.

4. An apparatus for providing secure viewing of a primary image on a display by a viewer comprising:

a screen adapted for being disposed between said display and said viewer;

means for generating a mask of light on said screen with an encoded time and intensity sequence, said mask of light mixing with said primary image to obscure viewing of the primary image; and viewing means for use by the viewer for separating said mask of light from said primary image to allow the primary image to be viewed only through said viewing means, so that the viewer only sees the primary image.

5. The apparatus of claim 4 wherein said viewing means is in communication with said means for generating a mask of light, said viewing means being adapted to block said mask of light.

6. The apparatus of claim 5 wherein said viewing means includes an electronic shutter.

7. The apparatus of claim 4 wherein said screen is a thin, transparent sheet of material, said mask of light being transmitted into the interior of said sheet of material.

8. The apparatus of claim 6 wherein said electronic shutter includes control means for providing a timing sequence matched to the encoded time and intensity sequence of said mask of light.

9. The apparatus of claim 8 wherein said electronic shutter is comprised of eyeglasses worn by the viewer.

10. The apparatus of claim 8 wherein said electronic shutter is comprised of electronically controlled liquid crystals.

11. The apparatus of claim 4 wherein said screen is provided between a cover plate and display of a cathode ray tube.

12. The apparatus of claim 8 wherein the encoded time and intensity sequences is random in one or both of time and intensity.

\* \* \* \* \*